July 21, 1970   D. J. BENETEAU   3,521,026
MULTIPLE WELDING ELECTRODE
Filed Oct. 25, 1968

INVENTOR.
DONALD J. BENETEAU
BY Chas. Krassov
Attorney

United States Patent Office 3,521,026
Patented July 21, 1970

3,521,026
MULTIPLE WELDING ELECTRODE
Donald Joseph Beneteau, R.R. 2, Amherstburg,
Ontario, Canada
Filed Oct. 25, 1968, Ser. No. 770,637
Int. Cl. B23k 9/29
U.S. Cl. 219—119          2 Claims

ABSTRACT OF THE DISCLOSURE

In resistance multiple spot welding where several electrodes are slidably contained in a single electrically conductive block, an electrode which is divided into two parts on an inclined plane. When pressure is applied to the electrode during a welding operation the two parts slide upon each other along the inclined plane causing jamming between the electrode and the block thereby insuring good contact for the passage of an electric current.

---

Figures 1, 2, 3, 4:
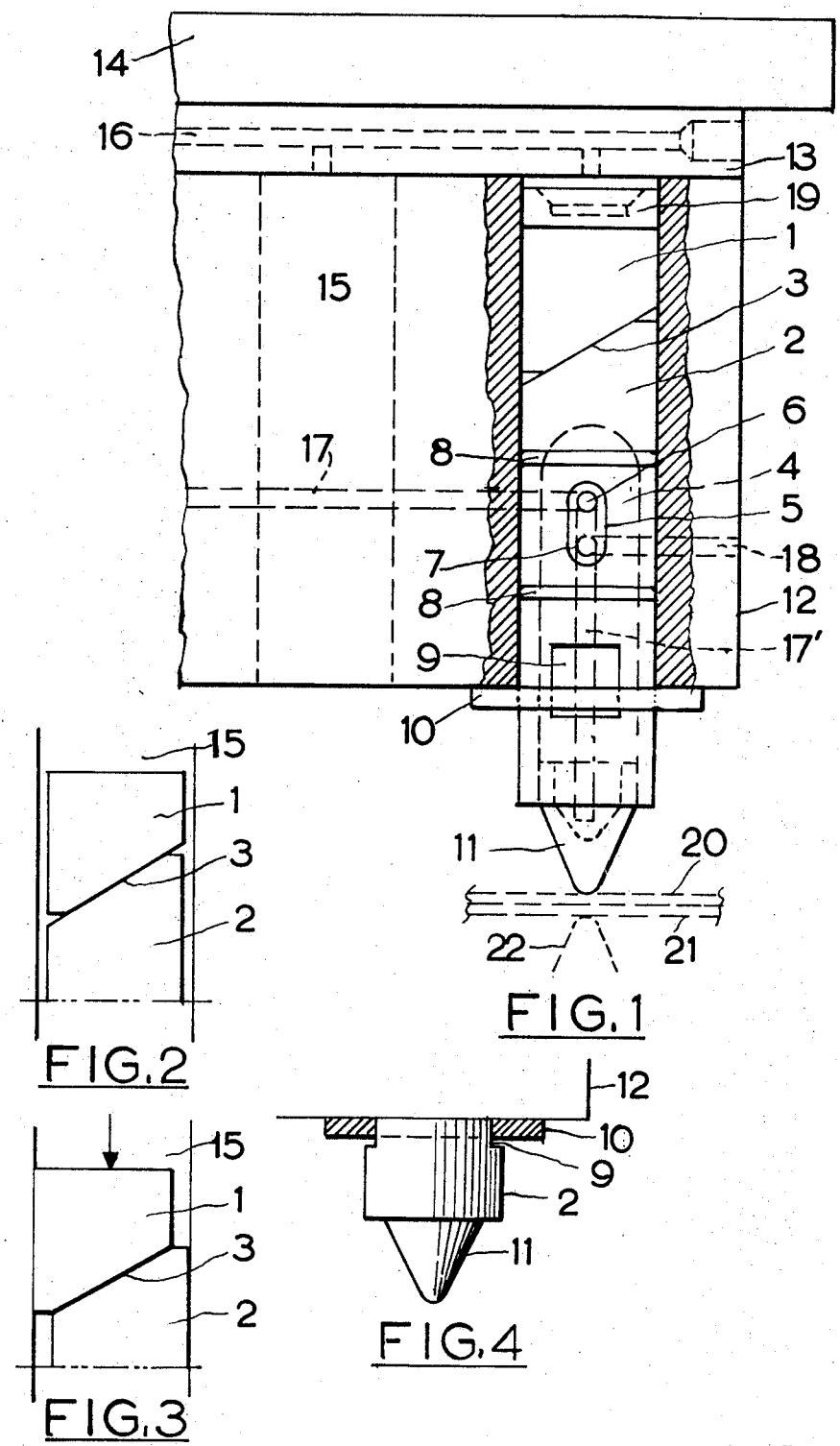

This invention relates generally to resistance welding electrodes, and particularly to electrodes used in multiple spot welding operations.

The process of spot welding two metals together consists of pressing two electrodes together with the metal between them and passing an electric current through the said electrodes; this causes fusion of the metals at the point of contact.

Where a single spot weld is required the operation is comparatively simple, however, where a number of spot welds are required it has been found that welding the entire number of spots simultaneously is the most economical way of doing it. This process, which will be referred to as multiple spot welding, involves several difficulties which this invention is able to overcome.

In multiple spot welding operations two very important controls must be maintained in order to obtain satisfactory results. In the first place the pressure applied to the electrodes must be uniformally and equally distributed between all the welding spots. Failure to maintain uniform pressure distribution results in some of the welds having poor or no fusion at all, and the item to be welded is defective. The variation in pressure upon the electrodes is caused mostly by the irregularity of the metal thickness and by the contour of the items to be welded. Very minute differences in metal thickness can cause harmful variations in pressure. In order to overcome this condition, the electrodes, which are contained in a common electrically conductive block, are allowed a small amount of up and down movement so that when pressure is applied each of the electrodes is able to seek and adjust itself to the required level.

This freedom of movement of the electrodes within the said block creates the second problem, i.e. maintaining of uniform and equal electrical distribution between the electrodes, the failure of which also results in defective welding spots as described above. The poor electrical distribution is caused by the minute space which allows the movement of the electrode within the block, so that when one spot is fused, the electrical current has a tendency to bypass the remaining electrodes.

Therefore one object of this invention is to provide an electrode for multiple spot welding which has a limited up and down movement within its conductive block in order to maintain uniform pressure distribution among all of the electrodes.

Another object of the invention is to provide positive contact between the conductive block and all of its contained electrodes in order to insure continuous and uniform flow of electricity to each of the said electrodes.

This is accomplished in the invention by providing an electrode which is divided into two sections; the upper section being free to slide upon an inclined plane common to both sections, so that when pressure is applied to the split electrode jamming takes place between the electrode and the block, thus providing an uninterrupted flow of current to the electrode.

In describing the invention reference will be made to the attached drawings in which, FIG. 1 is an elevation of the invention,
FIG. 2 is a diagram showing the position of the electrode within the block after pressure has been applied,
FIG. 3 is a diagram showing the position of the electrode within the block after pressure has ben applied,
FIG. 4 shows items 9 and 10 with the electrode turned 90 degrees from its position in FIG. 1.

In the drawings is shown a cylindrical electrode consisting of two parts, an upper part and a lower part 2. The part 1 is free to slide upon the inclined surface 3 which is common to both parts of the electrode. The part 1 is the shorter of the two parts and is solid throughout. The part 2 has a hollow water cooling chamber 4 the bottom end of which is fitted with an electrode tip 11. The surface 3 is usually inclined at an angle which is less than 45 degrees in order to prevent locking between the electrode parts 1 and 2.

The outer surface of the electrode part 2 is provided with two oval shaped grooves 5, 5, one opposite the other. At the top of one of the grooves 5 there is a hole 6 leading into the water chamber 4. The groove 5 on the opposite side of the electrode has a similar hole 7 at the bottom thereof. This hole serves as the discharger of the cooling water. Above and below the grooves 5 are a pair of rubber O rings 8, 8, which serve the purpose of confining the entry and the discharge of the cooling water to the immediate location of the grooves 5. The object of these grooves is to make contact with the water feed and discharge passages 17 and 18 of the block 12 at any position of the electrode in its up and down movement. Two oppositely located flattened areas 9, 9, on the surface of the electrode are fitted with a washer 10 which limits the movement of the electrode to a required minimum as shown in FIG. 4.

To perform the multiple spot welding operation, the electrodes, which are of a conducting material such as copper, are inserted into a copper block 12, in which tubular holes 15 are provided for that purpose. In FIG. 1 is shown the block 12 with one empty tubular hole 15 and another occupied by an electrode. The number of holes 15 correspond to the number of electrodes required for the particular operation. The diameter of the electrode is such as to provide a sliding fit within the hole 15.

Above the block 12 is a manifold 13 containing a passage 16 having a connection to each of the holes 15. The passage 16 is filled with a grease packing which is fed to a rubber cap 19 in each of the holes 15 and on top of each of the electrodes. The block 12 and the manifold 13 are fixed to the platen 14 of a welding press.

Since this operation requires cooling by means of running water, a water inlet 17 is provided in the block 12 which makes contact with the grooves 5 of each of the electrodes, and consequently feeds water through the holes 6 down to the inside of the tip 11. The water than returns into the chamber 4 then out of the holes 7 in the opposite groove 5 which in turn makes contact with a discharge passage 18 in the block 12. Thus cooling is provided not only to the electrodes but also to the block 12.

In FIG. 1 are shown two metal plates 20 and 21 which are to be spot welded together at the spot where the positive electrode tip 11 meets the negative tip 22. When pressure is applied to the block 12 each electrode tip finds its own level and at the same time the grease pack on top of each electrode has a cushioning effect upon it; thus uniform distribution of pressure is provided between all of the electrodes.

The sliding fit of the the electrode in the hole 15 does not provied the best of contacts between itself and the block 12 for the passage of electricity. In FIG. 2 the space between the electrode and the said block is shown in exaggerated form before pressure has been applied. When pressure is applied as shown by the arrow in FIG. 3, the part 1 and the part 2 of the electrode slide upon the inclined surface 3 thus jamming the electrode tightly against the hole 15. This is also shown in FIG. 3 in exaggerated form, thus providing good contact for the passage of electricity.

This invention, which has proven itself capable of good performance in many and varied practical applications, has an additional advantage in its simplified construction which uses fewer parts than other set-ups for multiple spot welding.

Having described the invention, what I claim is:

1. Electrodes for multiple resistance welding slidably contained within a multiple welding block, each of said electrodes being split into an upper and lower section by an inclined surface common to both sections and upon which each section can slide when the said electrodes are under pressure, a manifold within the said block located above its contained electrodes and communicable with them, said manifold being filled with a heavy grease compound to provide resilience to the said electrodes when under pressure; a coolant chamber within each of said electrodes; a coolant intake, outlet, and passages within the said block, said passages making contact with the electrode coolant chambers; and each of said electrodes being provided with a standard welding tip.

2. Electrodes and block such as described in claim 1 in which the upper section of each of said electrodes is relatively shorter than the lower section, and each lower section is provided with a hollow coolant chamber which is open at the bottom and becomes totally enclosed when the said welding tip is attached, and two oval shaped grooves oppositely located on the wall of the lower section, leading into the coolant chamber, and communicating with the intake and outlet passages of the block.

References Cited

UNITED STATES PATENTS

| 2,372,117 | 3/1945 | Purat | 219—87 |
| 2,964,611 | 12/1960 | Boretti | 219—87 |
| 2,979,599 | 4/1961 | Width | 219—161 |

JOSEPH V. TRUHE, Primary Examiner

L. A. ROUSE, Assistant Examiner